US012460089B2

(12) United States Patent
Anandakrishnan et al.

(10) Patent No.: US 12,460,089 B2
(45) Date of Patent: Nov. 4, 2025

(54) SUBSTRATE COATED WITH A THERMAL MANAGEMENT MATERIAL (71) Applicant: Hewlett-Packard Development Company, L.P., Spring, TX (US)

(72) Inventors: Shreenath Anandakrishnan, Bangalore (IN); Kuan-Ting Wu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 529 days.

(21) Appl. No.: 17/915,152

(22) PCT Filed: Jan. 8, 2021

(86) PCT No.: PCT/US2021/012634
§ 371 (c)(1),
(2) Date: Sep. 28, 2022

(87) PCT Pub. No.: WO2021/206775
PCT Pub. Date: Oct. 14, 2021

(65) Prior Publication Data
US 2023/0113973 A1    Apr. 13, 2023

(51) Int. Cl.
C09D 5/00    (2006.01)
C09D 7/48    (2018.01)
C09D 7/61    (2018.01)
C09D 7/63    (2018.01)
C09D 175/04  (2006.01)

(52) U.S. Cl.
CPC ............ C09D 5/00 (2013.01); C09D 7/48 (2018.01); C09D 7/61 (2018.01); C09D 7/63 (2018.01); C09D 175/04 (2013.01)

(58) Field of Classification Search
None
See application file for complete search history.

(56) References Cited

U.S. PATENT DOCUMENTS

| | | |
|---|---|---|
| 5,359,174 A | 10/1994 | Smith et al. |
| 6,982,874 B2 | 1/2006 | Smalc et al. |
| 7,787,252 B2 | 8/2010 | Mertol |
| 9,073,500 B2 | 7/2015 | Awaad et al. |
| 10,178,773 B2 | 1/2019 | Chung et al. |
| 2019/0011074 A1 | 1/2019 | Fuller et al. |

FOREIGN PATENT DOCUMENTS

| | | |
|---|---|---|
| CN | 106750454 A | 5/2017 |
| RU | 2589744 C2 | 7/2016 |

OTHER PUBLICATIONS

Hirunpraditkoon et al., Kinetic study of vetiver grass powder filled polypropylene composites, Thermochimica Acta, vol. 482, Issues 1-2, Jan. 15, 2009, pp. 30-38, <https://www.sciencedirect.com/science/article/pii/S0040603108003328> (Year: 2009).*

Nilsaengrat, P., "Production of Insulation from COGON Grass Fiber and Rubber," Rajabhat Maha Sarakham University, Maha Sarakham, Thailand 44000, Jan. 27, 2020, 8 pages.

* cited by examiner

Primary Examiner — Cheng Yuan Huang
(74) Attorney, Agent, or Firm — SHOOK, HARDY & BACON L.L.P.

(57) ABSTRACT

Herein is described a substrate coated with a thermal management material for an electronic device, wherein the thermal management material comprises: a thermal conductive coat deposited on the substrate; and a heat insulation coat deposited on the thermal conductive coat, wherein the heat insulation coat comprises a plant root powder and a resin. A process for coating the substrate with a thermal management material, and an electronic device having a housing comprising a thermal management material is also described herein.

15 Claims, 2 Drawing Sheets

SUBSTRATE COATED WITH A THERMAL MANAGEMENT MATERIAL

BACKGROUND

Electronic devices such as laptops, tablets, mobile phones include various components located within a housing. Said housing may be used to protect electronic components and/or improve the visual appearance of the electronic device. Said housing may also be used for thermal management, for example, to control or dissipate heat emitted from the electronic device. Good thermal management reduces the risk of the device overheating or exploding; and reduces the risk of the electronic device user burning their skin. Good thermal management may also increase the lifetime of an electronic device.

BRIEF DESCRIPTION OF DRAWINGS

Examples will now be described, by way of non-limiting example, with reference to the accompanying drawings, in which.

DETAILED DESCRIPTION

Before the substrate coated with a thermal management material for an electronic device, the process for coating a substrate with a thermal management material for an electronic device: and the electronic device having a housing are disclosed and described, it is to be understood that this disclosure is not limited to the particular process details and materials disclosed herein because such process details and materials may vary somewhat. It is also to be understood that the terminology used herein is used for the purpose of describing, particular examples. The terms are not intended to be limiting because the scope of the present disclosure is intended to be limited by the appended claims and equivalents thereof.

It is noted that, as used in this specification and the appended claims, the singular forms "a", "an" and "the" include plural referents unless the context clearly dictates otherwise.

If a standard test is mentioned herein, unless otherwise stated, the version of the test to be referred to is the most recent at the time of filing this patent application.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

Concentrations, amounts, and other numerical data may be expressed or presented herein in a range format. It is to be understood that such a range format is used merely for convenience and brevity and thus should be interpreted flexibly to include the numerical values explicitly recited as the limits of the range and also to include all the individual numerical values or sub-ranges encompassed within that range as if each numerical value and sub-range is explicitly recited. As an illustration, a numerical range of "about 1 wt. % to about 5 wt. %" should be interpreted to include the explicitly recited values of about 1 wt. % to about 5 wt. % and also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list based on their presentation in a common group without indications to the contrary.

As used herein, the term "comprises" has an open meaning, which allows other, unspecified features to be present. This term embraces, but is not limited to, the semi-closed term "consisting essentially of" and the closed term "consisting of". Unless the context indicates otherwise, the term "comprises" may be replaced with either "consisting essentially of" or "consists of".

As used herein, the term "carried out" when used to refer to a process may be used interchangeably with "performed.

As used herein, the term "thermal management material" may refer to a material that controls and/or manages the dissipation of heat, for example, by the means of thermodynamics and a heat transfer mechanism. In some examples, the thermal management material comprises the combination of the thermal conductive coat and the heat insulation coat as described herein.

As used herein, the term "thermal conductive coat", may refer to a coat material that enables the conduction of heat. In some examples, the thermal conductive coat has a thermal conductivity from about 100 $Wm^{-1}K$ to about 500 $Wm^{-1}K^{-1}$ at 25° C. In some examples, the thermal conductive coat has a thermal conductivity of at least about 200 $Wm^{-1}K^{-1}$ at 25° C., or at least about 300 $Wm^{-1}K$ at 25° C. or at least about 400 $Wm^{-1}K$ at 25° C.

As used herein, the term "heat insulation coat", may refer to a coat material that inhibits the conduction of heat. In some examples, the heat insulation coat has a thermal conductivity less than the thermal conductive coat. In some examples, the heat insulation coat has a thermal conductivity at least 200 times less than the thermal conductive coat, or at least 5000 times less than the thermal conductive coat. In some examples, the heat insulation coat may have a thermal conductivity from about 0.1 $Wm^{-1}K$ to about 0.5 $Wm^{-1}K$ at 25° C. In some examples, the heat insulation coat has a thermal conductivity of less than about 0.3 $Wm^{-1}K^{-1}$ at 25° C., or less than about 0.25 $Wm^{-1}K$ at 25° C., or less than about 0.2 $Wm^{-1}K$ at 25° C., or less than about 0.15 $Wm^{-1}K$ at 25° C.

Any thermal conductivity referred to herein may be measured in accordance with ASTM E1225-13.

As used herein, the term "heat generating component" may refer to a component of the electronic device that emits heat.

As used herein, the term "hotspot" may refer to any part of the electronic device that has a higher localised average thermal temperature as compared to the other parts of the electronic device. In some examples, a "hotspot" may occur at a heat generating component of an electronic device, or may occur at parts of the electronic device that are proximal to a heat generating component.

As used herein, the term "screen printing" refers to a process wherein a coating solution is pressed through a stencilled mesh screen onto the substrate surface, for example, to create a printed design.

As used herein, the term "slot die" refers to a process wherein a coating solution is delivered onto a substrate via a slot positioned close to the substrate surface.

As used herein, the term "spray coating" refers to a process wherein a coating is sprayed solution through the air onto the substrate surface. In some examples, the spray coating employs compressed gas, for example air, to atomize and direct the coating particles onto the substrate surface.

As used herein, the term "inkjet printing" refers to a process wherein a printer jets droplets of coating solution (for example, ink) onto the substrate surface via one or more inkjet nozzles. In some examples, inkjet printing may be thermal or piezoelectric.

As used herein, the term "3D printing" refers to a process wherein a coating solution is applied to the substrate surface in layers according to the 3-dimensional coordinates of the substrate surface. In some examples, 3D printing may be selected from binder jetting, stereolithography (SLA), digital light processing (DLP), fused deposition modelling (FDM), selective laser sintering (SLS) and polyjet printing.

As used herein, the term "aligned" may refer to the position of components within the electronic device, wherein the components share the same common axis. In other words, the components are located at the same relative position in the electronic device.

As used herein, the term "polymer" refers to a molecule, or description of a molecule, composed of repeating sub-units or monomers.

As used herein, the term "copolymer" refers to a molecule composed of two or more repeating subunits or monomers.

As used herein, the term "porous" refers to a material comprising pores through which air can pass. As used herein, the term "porosity" refers to the percentage of pore volume in a material over the total volume of the material.

Unless otherwise stated, any feature described herein can be combined with any other feature described herein. The features of any dependent claim may also be readily combined with the features of any of the independent claims or other dependent claims.

In some examples, there is provided a substrate coated with a thermal management material for an electronic device, wherein the thermal management material comprises: a thermal conductive coat deposited on the substrate; and a heat insulation coat deposited on the thermal conductive coat, wherein the heat insulation coat comprises a plant root powder and a resin.

In some examples, there is provided a process for coating a substrate with a thermal management material for an electronic device comprising: applying a thermal conductive coating solution to the substrate; heating the substrate to form a thermal conductive coat deposited on the substrate; applying a heat insulation coating solution to the thermal conductive coat, wherein the heat insulation coating solution comprises a plant root powder and a resin; and heating the substrate to form a heat insulation coat deposited on the thermal conductive coat.

In some examples, there is provided an electronic device having a housing, wherein the housing comprises: a substrate; a thermal conductive coat deposited on the substrate; and a heat insulation coat deposited on the thermal conductive coat, wherein the heat insulation coat comprises a plant root powder and a resin.

The present inventors have found that substrates coated with a heat insulation coat comprising plant root powders and a resin in combination with a thermal conductive coat according to the present disclosure can be used to successfully manage and dissipate heat generated from electronic devices and electronic device components, particularly at electronic hotspots. The thermal management materials described herein may, in some cases, be used to prevent overheating of an electronic device; increase the lifetime of an electronic device; reduce the fire or explosion risk associated with an electronic device; and/or reduce the chance of an electronic device burning the user's skin. The heat insulation coat described herein comprising plant root powders may also be more ecologically friendly and biodegradable as compared to synthetic thermal management materials. The thermal management material described herein may be lightweight and may have a reduced overall thickness as compared to prior thermal management materials, for example, as compared to heat spreader films.

Substrate Coated with a Thermal Management Material

In some examples, there is provided a substrate coated with a thermal management material for an electronic device, wherein the thermal management material comprises; a thermal conductive coat deposited on the substrate: and a heat insulation coat deposited on the thermal conductive coat, wherein the heat insulation coat comprises a plant root powder and a resin.

Substrate

In some examples, the substrate comprises a metal alloy selected from an aluminium alloy, a magnesium alloy, a lithium alloy, a titanium alloy and stain steel or a combination thereof. These metals may be light-weight and may provide durable housing. In an example, the metal alloy substrate comprises an aluminium alloy. The metal alloy may comprise a content of metal of at least about 75 wt. %, or at least 80 wt. % %, or at least 85 wt. %, or at least 90 wt. %. For example, when the metal alloy is an aluminium alloy, the aluminium alloy may comprise at least 75 wt. % aluminium, or about 80 wt. % aluminium, or at least 85 wt. % aluminium, or at least about 90 wt. % of aluminium, based on the total weight of the metal alloy. In some cases, the aluminium alloy may further comprise magnesium, zinc, manganese, silicon, copper, a rare earth metal or zirconium. In some examples, the aluminium alloy is aluminium alloy 6063.

In some examples, the substrate comprises a plastic selected from polybutylene terephthalate, polyphenylene sulfide, polyamides polyphthalamide, acrylonitrile butadiene styrene, polyetheretherketone, polyester, polyurethane, polycarbonate and acrylonitrile butadiene styrene with polycarbonate, or a combination thereof. In some examples, the substrate comprises carbon fibre. In some examples, the substrate is a composite of a metal alloy and carbon-fibre; a plastic and carbon-fibre; a metal alloy and a plastic; a metal alloy, a plastic and a carbon-fibre, or a combination thereof.

In some examples, the substrate is an injection-molded substrate comprising a metal alloy and a plastic. In some examples, the insert molded metal substrate may be formed by using the metal substrate as a mold. This metal mold may have a section into which a material, such as plastic, s injected to form a plastic insert.

In some examples, the electronic device is selected from a computer (e.g. an all-in-one computer), a laptop, a tablet, a cell phone, a portable networking device, a portable gaming device and a portable GPS.

Thermal Conductive Coat

In some examples, the thermal conductive coat comprises a thermal conductive material and a resin. The thermal conductive material may be any suitable material that thermally conducts heat. In some examples, the thermal conductive material may have a thermal conductivity from about 100 $Wm^{-1}K_{-1}$ to about 500 $Wm^{-1}K_{-1}$ at 25° C. in some examples, the thermal conductive material may have a thermal conductivity of at least about 100 $Wm^{-1}K^{-1}$, or at least about 150 $Wm^{-1}K_{-1}$ or at least about 200 Wm or at least about 300 $Wm^{-1}K_{-1}$, or at least about 350 $Wm^{-1}K_{-1}$, wherein the thermal conductivity is measured at 25° C.

In some examples, the thermal conductive material is a metal, a metal salt, a semi-metal salt, or a carbon allotrope. In some examples, the thermal conductive material is selected from copper, aluminium, silver, graphite, graphene, aluminium nitride, boron nitride, silicon carbide and combinations thereof.

In some examples, the thermal conductive material may have an average particle size from about 1 μm to about 30 μm. In some examples, the thermal conductive material may have an average particle size of at least about 1 μm, or at least about 5 μm, or at least about 10 μm, or at least about 15 μm, or at least about 20 μm, or at least about 25 μm. In some examples, the thermal conductive material may have an average particle size that is less than about 30 μm, or less than about 25 μm, or less than about 20 μm, or less than about 15 μm, or less than about 10 μm, or less than about 5 μm. In some examples, the average particle size of the plant root powder may be measured in accordance with ASTM 06131-17.

In some examples, the thermal conductive material may be present in the thermal conductive coat in an amount from about 0.74 wt. % to about 25 wt. %, or from about 1 wt. % to about 20 wt. %, or from about 2.5 wt. % to about 15 wt. %, or from about 5 wt. % to about 10 wt. % based on the total weight of the thermal conductive coat. In some examples, the thermal conductive material is present in the thermal conductive coat in an amount greater than about 0.74 wt. %, or greater than about 1 wt. %, or greater than about 3 wt. %, or greater than about 5 wt. %, or greater than about 7.4 wt. %, based on the total weight of the thermal conductive coat. In some examples, the thermal conductive material is present in the thermal conductive coat in an amount less than about 23 wt. %, or less than about 20 wt. %, or less than about 15 wt. %, or less than about 10 wt. %, based on the total weight of the thermal conductive coat.

In some examples, the resin of the thermal conductive coat is a synthetic polymer or co-polymer. In some examples, the resin of the thermal conductive coat is selected from polyurethane, polyacrylic, polyester, polyester-polyether copolymer, and polyamide-polyether copolymer.

In some examples, the resin of the thermal conductive coat is present in the thermal conductive coat in an amount from about 72.5 wt. % to about 99 wt. %, or from about 85 wt. % to about 95 wt. %, or from 88 wt. % to about 91 wt. % based on the total weight of the thermal conductive coat. In some examples, the resin of the thermal conductive coat is present in the thermal conductive coat in an amount greater than about 72.5 wt. %, or greater than about 75 wt. %, or greater than about 80 wt. %, or greater than about 85 wt. %, based on the total weight of the thermal conductive coat. In some examples, the resin of the thermal conductive coat is present in the thermal conductive coat in an amount less than about 99 wt. %, or less than about 95 wt or less than about 90 wt. %, based on the total weight of the thermal conductive coat.

In some examples, the weight ratio of the thermal conductive material to the resin in the thermal conductive coat is from about 1:3 to about 1:130, or from about 1:5 to about 1:20, or from about 1:9 to about 1:13, or from about 1:10 to about 1:12.

In some examples, the resin of the thermal conductive coat has a number average molecular weight from about 5000 g/mol to about 10000 g/mol. In some examples, the resin of the thermal conductive coat has a number average molecular weight greater than about 5000 g/mol, or greater than about 7500 g/mol. In some examples, the resin of the thermal conductive coat has a number average molecular weight less than about 10000 g/mol, or less than about 7500 g/mol.

In some examples, the thermal conductive coat has an average thickness of about 5 μm to about 100 μm. In some examples, the thermal conductive coat has an average thickness of greater than about 5 μm, or greater than about 10 μm, or greater than about 20 μm, or greater than about 30 μm, or greater than about 40 μm, or greater than about 50 μm, or greater than about 60 μm, or greater than about 70 μm, or greater than about 80 μm, or greater than about 90 μm. In some examples, the thermal conductive coat has an average thickness of less than about 100 μm, or less than about 90 μm, or less than about 80 μm, or less than about 70 μm, or less than about 60 μm, or less than about 50 μm, or less than about 40 μm, or less than about 30 μm, or less than about 20 μm, or less than about 10 μm. The average thickness of the thermal conductive coat may be a mean average thickness and may be measured after the coating has been applied, for example, a micrometre screw gauge or scanning electron microscope (SEM).

In some examples, the thermal conductive coat is substantially free of solvent. Substantially free may refer to the thermal conductive coat comprising less than about 20 wt. % solvent, or less than about 10 wt. % solvent, or less than about 5 wt. % solvent, or less than about 1 wt. % solvent, or less than 0.1 wt. % solvent, based on the total weight of the thermal conductive coat.

In some examples, the thermal conductive coat further comprises a surfactant. The surfactant of the thermal conductive coat may be selected from sodium dodecyl sulfate (SDS), alkylbenzoate, alkylbenzene sulfonates, polyglycol ethers, alkylaryl sulfonates, alkyl sulfates or a combination thereof.

The thermal conductive coat may provide fast heat dissipation at the surface of the substrate, for example, from the housing of an electronic device.

Heat Insulation Coat

The heat insulation coat may comprise any suitable plant root powder, in some examples, the plant for the plant root powder is selected from *Paspalidium geminatum, Cyperus eragrostis, Rumex crispus, Plantago lanceolate*, lavancha, vetiver and combinations thereof. In an example, the plant root powder is lavancha root powder.

In some examples, the plant root powder may be porous. In some examples, the plant root powders may have a porosity of from about 60% to about 85%. In some examples, the plant root powder may have a porosity of greater than about 60%, or greater than about 65%, or greater than about 70%, or greater than about 75%, or greater than about 80%. In some examples, the pores of the plant root powder may have a pore size ranging from about 0.4 μm to about 50 μm. In some examples, the pores of the plant root powder may have a size of at least about 0.4 μm, or at least about 1 μm, or at least about 5 μm, or at least about 10 μm, or at least about 20 μm, or at least about 30 μm, or at least about 40 μm. In some examples, the plant root powder may have an average pore size of at least about 0.4 μm, or at least about 1 μm, or at least about 5 μm. In some examples, porosity may be determined by ASTM C20, Pore size may be determined using standard electron micrography, for example, at 300× magnification. Pore size may refer to the diameter of the pore and average pore size may refer to the mean average pore size. The high porosity and large pore size of plant roots may, in some cases, contribute to the effective thermal management and heat dissipation demonstrated by the heat insulation coat.

In some examples, the plant root powder has an average particle size of from about 1 μm to about 50 μm. In some examples, the plant root powder has an average particle size of greater than about 1 μm, or greater than about 5 μm, or greater than about 10 μm, or greater than about 20 μm, or greater than about 30 μm, or greater than about 40 μm. In some examples, the plant root powder has an average particle size of less than about 50 μm, or less than about 40 μm, or less than about 30 μm, or less than about 20 μm, or less than about 10 μm. In some examples, the average particle size of the plant root powder may be measured in accordance with ASTM 06131-17.

In some examples, the plant root powder has a density of less than 0.5 g/cm$^3$, or less than 0.3 g/cm$^3$. The low density of the plant root powder may ensure that the heat insulation coat is lightweight.

In some examples, the plant root powder is present in the heat insulation coat in an amount of from about 6.25 wt % to about 55 wt. %, or from about 7.5 wt. % to about 45 wt. %, or from about 8 wt. % to about 35 wt. %, or from about 15 wt. % to about 30 wt. %, or from about 20 wt. % to about 25 wt. %, based on the total weight of the heat insulation coat. In some examples, the plant root powder is present in the heat insulation coat in an amount greater than about 6.25 wt. %, or greater than about 7.5 wt. %, or greater than about 8 wt %, or greater than about 10 wt. %, or greater than about 12.5 wt. %, or greater than about 15 wt. %, or greater than about 20 wt. %, based on the total weight of the heat insulation coat. In some examples, the plant root powder is present in the heat insulation coat in an amount less than about 55 wt. %, or less than about 40 wt. %, or less than about 30 wt. %, or less than about 25 wt. %, based on the total weight of the heat insulation coat.

The heat insulation coat may comprise any suitable resin. In some examples, the resin of the heat insulation coat may be a synthetic polymer or co-polymer. The resin of the heat insulation coat may be the same or different to the resin in the thermal conductive coat.

In some examples, the resin of the heat insulation coat may be selected from polyurethane, polyacrylic, polyester, ethylene-vinyl acetate (EVA), polyamide, polyester-polyether copolymer, polyaminde-polyether copolymer and combinations thereof. In an example, the resin of the heat insulation coat is polyurethane.

In some examples, the resin of the heat insulation coat is present in the heat insulation coat in an amount from about 43 wt. % to about 92 wt. %, or from about 50 wt. % to about 90 wt. %, or from about 65 wt. % to about 85 wt. %, or from about 70 wt. % to about 80 wt. %, based on the total weight of the heat insulation coat. In some examples, the resin of the heat insulation coat is present in the heat insulation coat greater than about 43 wt. %, or greater than about 55 wt. %, or greater than about 60 wt. %, or greater than about 65 wt. %, or greater than about 70 wt. %, based on the total weight of the heat insulation coat. In some examples, the resin of the heat insulation coat is present in the heat insulation coat in an amount less than about 92 wt. %, or less than about 90 wt. %, or less than about 85 wt. %, or less than about 80 wt. %, based on the the total weight of the heat insulation coat. Said amounts of resin may be required for good coating adhesion and bonding strength.

In some examples, the weight ratio of the plant root powder to the resin in the heat insulation coat is from about 1.14 to about 1.2:1, of from about 1:5 to about 1:2, or from about 1:4 to about 1:3.

In some examples, the resin of the heat insulation coat may have a number average molecular weight from about 5000 g/mol to about 10000 g/mol. In some examples, the resin of the heat insulation coat may have number average molecular weight greater than about 5000 g/mol, or greater than about 7500 g/mol. In some examples, the resin of the heat insulation coat may have number average molecular weight less than about 10000 g/mol, or less than about 7500 g/mol.

In some examples, the heat insulation coat may further comprise a surfactant. In some examples, the surfactant of the heat insulation coat may be selected from poly(oxyethylene)-co-poly(oxypropylene)s, polyoxyethylene glycol octylphenol ethers, ethoxylated aliphatic alcohols, carboxylic esters, polyethylene glycol esters, anhydrosorbitol esters, carboxylic amides, polyoxyethylene fatty acid amides, polyethylene glycol) p-isooctyl-phenyl ethers or a combination thereof. In an example, the surfactant is a polyethyleneglycol ester.

In some examples, the heat insulation coat is substantially free of solvent. Substantially free may refer to the heat insulation coat comprising less than 20 wt. % solvent, or less than 10 wt. % solvent, or less than 5 wt. % solvent, or less than 1 wt. % solvent, or less than 0.1 wt. % solvent, based on the total weight of the heat insulation coat.

In some examples, the heat insulation coat has an average thickness of from about 30 μm to about 120 μm. In some examples, the heat insulation coat has an average thickness of greater than about 30 μm, or greater than about 40 μm, or greater than about 50 μm, or greater than about 60 μm, or greater than about 70 μm, or greater than about 80 μm, or greater than about 90 μm, or greater than about 100 μm, or greater than about 110 μm. In some examples, the heat insulation coat has an average thickness of less than about 120 μm, or less than about 110 μm, or less than about 100 μm, or less than about 90 μm, or less than about 80 μm, or less than about 70 μm, or less than about 60 μm, or less than about 50 μm, or less than about 60 μm, or less than about 40 μm. In some examples, the heat insulation coat has a larger average thickness than the thermal conductive coat. The average thickness of the heat insulation coat may be a mean average thickness which may be measured after the coating has been applied, for example, using a micrometre screw gauge or scanning electron microscope (SEM).

In some examples, the heat insulation coat is deposited on a portion of the thermal conductive coat. In some examples, the heat insulation coat is deposited on less than about 95%, or less than about 90%, or less than about 85%, or less than about 80%, or less than about 75%, or less than about 70%, or less than about 65%, or less than about 60%, or less than about 55%, or less than about 50%, or less than about 45%, or less than about 40%, or less than about 35%, or less than about 30%, or less than about 25%, or less than about 20%, or less than about 15%, or less than about 10%, or less than about 5%, or less than about 1%. The heat insulation coat described herein may, in some cases, be used to channelize the heat and/or reduce the heat at certain portions of the substrate, for example, at hotspots. In some examples, the heat insulation coat is deposited on portions of the thermal conductive coat at parts of the substrate that are alignable with or proximal to a heat generating component when used as a casing for an electronic device.

Figure 1:
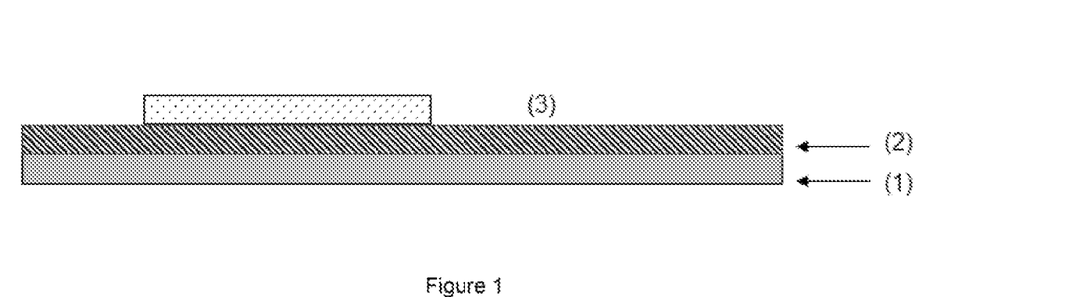
FIG. 1 demonstrates a partial cross-sectional diagram showing an example substrate coated with a thermal management material for an electronic device.

FIG. 1 shows an example substrate (1) coated with a thermal management material for an electronic device. The thermal management material comprises a thermal conductive coat (2) deposited on the substrate; and a heat insulation coat (3) deposited on the thermal conductive coat.

Process for Coating a Substrate with a Thermal Management Material

In some examples, there is provided a process for coating a substrate with a thermal management material for an electronic device comprising: applying a thermal conductive coating solution to the substrate; heating the substrate to form a thermal conductive coat deposited on the substrate; applying a heat insulation coating solution to the thermal conductive coat, wherein the heat insulation coating solution comprises a plant root powder and a resin; and heating the substrate to form a heat insulation coat deposited on the thermal conductive coat, in some examples, the thermal conductive coat and the heat insulation coat may be as described herein. In some examples, the process may be used to form a substrate coated with a thermal management material for an electronic device as described herein.

In some examples, the thermal conductive coating solution is applied to the substrate by screen printing, slot die, spray coating, inkjet printing or 3D printing. In an example, the thermal conductive coating solution is applied using screen printing. Screen-printing may enable a cost-effective and a simple coating process.

In some examples, the thermal conductive coating solution comprises a thermal conductive material and a resin. The thermal conductive material or resin for the thermal conductive coat may be as described herein. In some examples, the thermal conductive material is present in the thermal conductive coating solution in an amount from about 0.5 wt. % to about 15 wt. %, based on the total weight of the thermal conductive coating solution. In some examples, the thermal conductive material is present in the thermal conductive coating solution in an amount greater than about 0.5 wt. %, or greater than about 2.5 wt. %, or greater than about 5 wt. %, or greater than about 7.5 wt. %, or greater than about 10 wt. %, or greater than about 12.5 wt. %, based on the total weight of the thermal conductive coating solution. In some examples, the thermal conductive material is present in the thermal conductive coating solution in an amount less than about 15 wt. %, or less than about 12.5 wt. %, or less than about 10 wt. %, or less than about 7.5 wt. %, or less than about 5 wt. %, or less than about 2.5 wt. %, based on the total weight of the thermal conductive coating solution.

In some examples, the resin is present in the thermal conductive coating solution in an amount from about 45 wt. % to about 65 wt. %, based on the total weight of the thermal conductive coating solution. In some examples, the resin is present in the thermal conductive coating solution in an amount greater than about 45 wt. %, or greater than about 50 wt. %, or greater than about 55 wt. %, or greater than about 60 wt. %, based on the total weight of the thermal conductive coating solution. In some examples, the resin is present in the thermal conductive coating solution in an amount less than about 65 wt. %, or less than about 60 wt. %, or less than about 55 wt. %, or less than about 50 wt. %, based on the total weight of the thermal conductive coating solution.

In some examples, the thermal conductive coating solution may further comprise a solvent. In some examples, the solvent of the thermal conductive coating solution is present in the thermal conductive coating solution in an amount from about 20 wt. % to about 38.5 wt. %, based on the total weight of the thermal conductive coating solution. In some examples, the solvent of the thermal conductive coating solution may be selected from tert-butyl alcohol, ethyl acetate, butyl acetate, xylene, dipropylene glycol methyl ether, methyl ethyl ketone, chlorinated hydrocarbons (e.g. chloroform), or a combination thereof. In some examples, the solvent of the thermal conductive coating solution may have a boiling point from about 70 QC to about 200° C. In some examples, the solvent of the thermal conductive coating solution may have a boiling point of less than about 200° C., or less than about 175° C., or less than about 150° C. In some examples, the solvent of the thermal conductive coating solution may have a boiling point of greater than about 70° C., or greater than about 100° C., or greater than about 125° C.

In some examples, the thermal conductive coating solution may further comprise a surfactant, as may be described herein. In some examples, the surfactant may be present in the thermal conductive coating solution in an amount from about 0.3 wt. % to about 2 wt. % based on the total weight of the thermal conductive coating solution.

After application of the thermal conductive coating solution, the substrate is heated using any suitable method, for example, by oven baking. In some examples, the substrate may be heated to a temperature from about 60° C. to about 80° C., or from about 65° C. to about 75° C. In some examples, the substrate may be heated to a temperature greater than about 60° C., or greater than about 65° C., or greater than about 75° C. In some examples, the substrate may be heated to a temperature of less than 80° C., or less than 75° C., or less than about 70° C., or less than about 65° C. In some examples, the substrate is heated for a time period from about 15 minutes to about 40 minutes. In some examples, the substrate is heated for a time period of greater than about 15 minutes, or greater than about 25 minutes, or greater than about 35 minutes. In some examples, the substrate is heated for a time period of less than about 40 minutes, or less than about 30 minutes, or less than about 20 minutes. In some examples, during heating, air is applied to the substrate coated with the thermal conductive coating solution. The application of air may be used to more effectively dry and/or more efficiently remove solvent from the thermal conductive coating solution to form the thermal conductive coat.

In some examples, the heat insulation coating solution is applied to the thermal conductive coat by screen printing, slot die, spray coating, inkjet printing or 3D printing. In an example, the heat insulation coating solution is applied using screen printing. Screen-printing may enable a cost-effective and a simple coating process. In some examples, the heat insulation coating solution is applied to a portion of the thermal conductive coat, as may be described herein. In some examples, the heat insulation coating solution is applied to a portion of the thermal conductive coat by screen printing.

The heat insulation coating solution may comprise any suitable plant root power and resin as may be described herein. In some examples, the plant root powder may be present in the heat insulation coating solution in an amount from about 5 wt. % to about 30 wt. %, or from about 7.5 wt. % to about 25 wt. %, or from about 10 wt. % to about 20 wt.

%, based on the total weight of the heat insulation coating solution. In some examples, the plant root powder may be present in the heat insulation coating solution in an amount greater than about 5 wt. %, or greater than about 10 wt. %, or greater than or equal to about 15 wt. %, based on the total weight of the heat insulation coating solution, in some examples, the plant root powder may be present in the heat insulation coating solution in an amount less than about 30 wt. %, or less than about 25 wt. %, or less than about 20 wt. %, or less than or equal to about 15 wt. %, based on the total weight of the heat insulation coating solution.

In some examples, the resin may be present in the heat insulation coating solution in an amount from about 25 wt. % to about 73 wt. %, or from about 30 wt. % to about 70 wt. %, or from about 35 wt. % to about 65 wt. %, or from about 40 wt. % to about 60 wt. %, by weight of the heat insulation coating solution. In some examples, the resin may be present in the heat insulation coating solution in an amount greater than about 25 wt. %, or greater than about 30 wt. % or greater than about 40 wt. %, or greater than about 50 wt. %, or greater than about 60 wt. %, or greater than about 65 wt. %, based on the total weight of the heat insulation coating solution. In some examples, the resin may be present in the heat insulation coating solution in an amount less than about 73 wt. %, or less than about 65 wt. %, or less than about 60 wt. %, or less than about 50 wt. %, or less than about 40 wt. %, or less than about 30 wt. %, based on the total weight of the heat insulation coating solution.

In some examples, the heat insulation coating solution may comprise a solvent. In some examples, the solvent of the heat insulation coating solution is an organic solvent. In some examples, the solvent of the heat insulation coating solution may have a boiling point from about 70° C. to about 200° C. In some examples, the solvent of the heat insulation coating solution may have a boiling point of less than about 200° C., or less than about 175° C., or less than about 150° C. in some examples, the solvent of the heat insulation coating solution may have a boiling point of greater than about 70° C., or greater than about 75° C., or greater than about 100° C., or greater than about 125° C.

In some examples, the solvent of the heat insulation coating solution may be selected from methyl isobutyl ketone, 3-methoxy-3-methyl-1-butyl acetate, ethyl acetate, butyl acetate, propylene glycol monomethyl ether, ethylene glycol mono tert-buthyl Ether, dipropylene glycol methyl ether, diethylene glycol butyl ether, ethylene glycol monobutyl ether, 3-Methoxy-3-Methyl-1-butanol, isobutyl alcohol, 1,4-butanediol, N,N-dimethyl acetamide, xylene or a combination thereof. In one example, the solvent of the heat insulation coating solution is butyl acetate.

In some examples, the solvent of the heat insulation coating solution may be present in the heat insulation coating solution in an amount from about 20 wt. % to about 43 wt. % of the heat insulation coating solution, or from about 25 wt. % to about 37.5 wt. %, or from about 30 wt. % to about 36 wt. %. In some examples, the solvent of the heat insulation coating solution may be present in the heat insulation coating solution in an amount greater than about 20 wt. %, or greater than about 25 wt. %, or greater than about 30 wt. %. In some examples, the solvent of the heat insulation coating solution may be present in the heat insulation coating solution in an amount less than about 43 wt. %, or less than about 40 wt. %, or less than about 35 wt. %, based on the total weight of the heat insulation coating solution.

In some examples, the heat insulation coating solution may further comprise a surfactant, which may be any surfactant as described herein. In some examples, the surfactant of the heat insulation coating solution may be present in the heat insulation coating solution in an amount from about 0.3 wt. % to about 2 wt. %, or from about 0.5 wt. % to about 1.75 wt. %, or from about 0.75 wt. % to about 1.5 wt. %, based on the total weight of the heat insulation coating solution. In some examples, the surfactant of the heat insulation coating solution may be present in the heat insulation coating solution in an amount greater than about 0.3 wt. %, or greater than about 0.5 wt. %, or greater than about 0.75 wt. %, or greater than about 1 wt. %, or greater than about 1.25 wt. %, or greater than about 1.5 wt. %, or greater than about 1.75 wt. %, based on the total weight of the heat insulation coating solution. In some examples, the surfactant of the heat insulation coating solution may be present in the heat insulation coating solution in an amount less than about 2 wt. %, or less than about 1.75 wt. %, or less than about 1.5 wt. %, or less than about 1.25 wt. %, or less than about 1 wt. %, or less than about 0.75 wt. %, or less than about 0.5 wt. %, based on the total weight of the heat insulation coating solution.

After application of the heat insulation coating solution, the substrate is heated using any suitable method, for example, by oven baking. In some examples, the substrate may be heated to a temperature from about 60° C. to about 80° C., or from about 65° C. to about 75° C. In some examples, the substrate may be heated to a temperature greater than about 60° C., or greater than about 65° C., or greater than about 75° C. In some examples, the substrate may be heated to a temperature of less than 80° C. or less than 75 QC, or less than 70° C., or less than 65° C. In some examples, the substrate is heated for a time period from about 15 minutes to about 40 minutes. In some examples, the substrate is heated for a time period of greater than about 15 minutes, or greater than about 25 minutes, or greater than about 35 minutes. In some examples, the substrate is heated for a time period of less than about 40 minutes, or less than about 30 minutes, or less than about 20 minutes. In some examples, during heating, air is applied to the heat insulation coating solution. The application of air may be used to more effectively dry and/or more efficiently remove solvent from the heat insulation coating solution to form the heat insulation coat.

An Electronic Device Having a Housing

In some examples, there is provided an electronic device having a housing, wherein the housing comprises: a substrate: a thermal conductive coat deposited on the substrate; and a heat insulation coat deposited on the thermal conductive coat, wherein the heat insulation coat comprises a plant root powder and a resin. The electronic device may be any suitable electronic device as may be described herein.

In some examples, the housing may provide an exterior part of the electronic device, such as a cover or a casing of the electronic device. The housing may be a cover, such as a lid, the casing or both the cover and the casing of the electronic device. The casing may form a top, a bottom or lower part of the cover of the electronic device. In some examples, the housing is the casing of a laptop, a tablet or a cell phone. In some examples, the housing may include a support structure for an electronic component of the electronic device. The housing may include a battery cover area, a battery door, a vent or combinations thereof. The housing may provide an exterior part of the electronic device for at least one component of the electronic device, for example, a touchpad, a fingerprint scanner, a trackball, a pointing stick, or a button, such as a mouse button or a keyboard button.

In some examples, the electronic device comprises a heat-generating component. In some examples, the heating generating component may comprise an electrical circuit. In some examples, the heat generating component may be selected from a liquid crystal display (LCD) panel, a light emitting diode (LED), a central processing unit (CPU), a circuit board, a battery, a heat pipe, a fin, or a vapour chamber. The housing may be external to the heat generating component. In some examples, the heat generating component is aligned with the heat insulation coat. In some examples, the heat generating component that is aligned with the heat insulation coat is separated from the heat insulation coat by a distance from about 0.5 to about 12 mm. This distance is measured in the direction perpendicular to the surface of the housing, i.e., the Z direction.

In some examples, the heat insulation coat is deposited on a portion of the thermal conductive coat that is aligned with or proximal to the heat generating component. In some examples, the heat insulation coat is deposited on a portion of the thermal conductive coat that is up to about 0.5 cm away from the heat generating component, or up to about 1 cm, or up to about 1.5 cm, or up to about 2 cm, or up to about 2.5 cm, or up to about 3 cm, or up to about 3.5 cm away from the heat generating component. This distance is measured on the housing surface, i.e., in the X-Y plane.

In some examples, the housing may provide the entire cover or casing of the electronic device. In some examples, the housing may provide a part of the cover or the casing of the electronic device. The term "part" in this context refers to at least about 1%, or at least 2.5%, or at least about 5%, or at least about 10%, or at least about 20%, or at least about 30%, or at least about 40%, or at least about 50%, or at least about 60%, at least about 70%, at least about 80 ti/o or at least about 90%, of the total weight of the cover or the casing.

Figure 2:
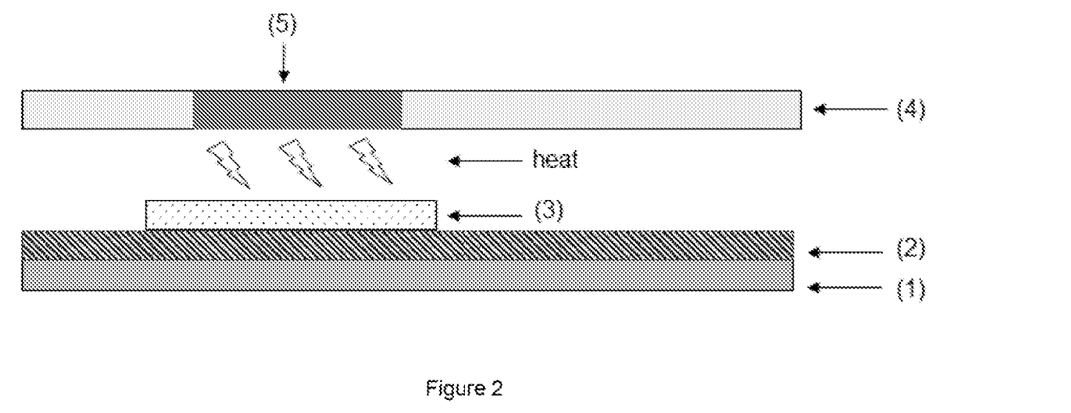
FIG. 2 demonstrates a partial crass-sectional diagram showing an example electronic device having a housing.
Figure 3:
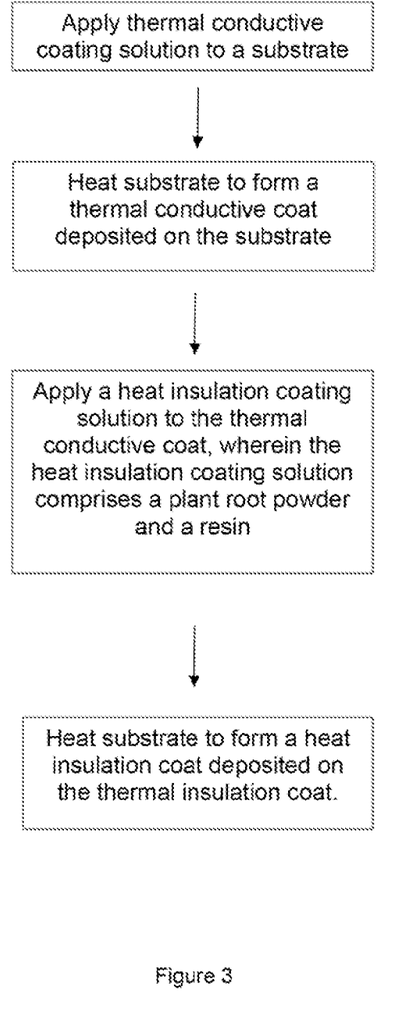
FIG. 3 shows a flowchart depicting an example process for coating a substrate with a thermal management material for an electronic device.

FIG. 2 shows an electronic device (4) having a housing, the housing comprising a substrate (1) a thermal conductive coat (2) deposited on the substrate; and a heat insulation coat (3) deposited on the thermal conductive coat. In this example, a heat generating component (5) of the electronic device is aligned with the heat insulation coat (3).

EXAMPLES

The following illustrates examples of a substrate coated with a thermal management material; a process for coating a substrate with a thermal management material, and an electronic device having a housing. Thus, these examples should not be considered as limitations of the present disclosure, but are merely in place to each how to make examples of the present disclosure. While a substrate coated with a thermal management material for an electronic device, the process for coating a substrate with a thermal management material for an electronic device and related aspects have been described with reference to certain examples, various modifications, changes, omissions, and substitutions can be made without departing from the spirit and scope of the present disclosure. It is intended, therefore, that the substrate, process, and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

Materials and Methods

Laptop: HP 1000 series
Laptop casing substrate: Aluminium alloy 6063

Thermal conductive coating solution: (1) 55 wt. % polyurethane [Trade name—Luxvdir; Mn—5000-1000 g/mol] (2) 5 wt. % copper; (3) 38.5 wt. % solvent: tert-butyl alcohol (4) 1.5 wt. % sodium dodecyl sulfate (SDS).

Heat insulation coating solution: (1) 15 wt. % lavancha root powder (2) 50 wt. % polyurethane resin [Trade name—Luxvdir; Mn—5000-1000 g/mol]] (3) 1.2 wt. % polyethylene glycol ester [Trade name—GT 8-60 3575; melting point—13° C.; Mn—1500—10000 g/mol](4) 33.8 wt. % butyl acetate

EXAMPLE

To the laptop casing substrate was applied a thermal conductive coating solution by screen printing using an Automatic Screen Printing Machine ATMA PC67. The substrate was subsequently heated at 70° C. for 15-40 minutes to form the thermal conductive coat. The thickness of the thermal conductive coat was about 50 μm.

A heat insulation coating solution was applied to the thermal conductive coat at portions of the casing aligned and proximal to the CPU in the electronic device, i.e. "at hotspots". The heat insulation coating was applied by screen printing using an Automatic Screen Printing Machine ATMA PC67. The substrate was subsequently heated at 70° C. for 15-40 minutes to form the heat insulation ccat. The thickness of the heat insulation coat was about 75 μm.

COMPARATIVE EXAMPLE

The laptop casing substrate was coated with the thermal conductive coating solution as described in the above Example. In this comparative example, no heat insulation coating was applied at the CPU or areas proximal to the CPU.

Results

Portions of the laptop adjacent to the CPU and a point 3.5 cm away from the CPU were tested for heat output, measured in ° C. This was tested in accordance with ASTM D149. The results of the test are demonstrated in Table 1, the temperatures are an average of two technical replicates.

TABLE 1

|  | CPU Area on top cover surface | 3.5 cm away from CPU area on top cover surface |
| --- | --- | --- |
| Comparative Example |  |  |
| Thermal conductive coating layer Example | 60.39 | 44.18 |
| Thermal conductive coating layer + Heat insulation coating layer | 57.60 | 41.77 |
| Difference | 2.79 | 2.41 |

As is demonstrated in Table 1, the presence of a heat insulation coating material adjacent and proximal to heat generating units was found to reduce the amount of heat emitted from the substrate at these hotspots. This effect was demonstrated at both a point adjacent to the CPU on the top cover surface of the laptop and at a point located 3.5 cm away from CPU area on the top cover surface of the laptop.

The results demonstrate that a heating insulation coat comprising a plant root powder and a resin may be used to successfully dissipate heat from hotspots in electronic devices in combination with a thermal conductive coating layer. In some cases, this can be used to i) reduce overheating of the electronic device, ii) increase the lifetime of the electronic device iii) reduce the risk of the user being burnt and/or iv) reduce the risk of fire or battery explosion. Heat insulation coats comprising plant root powders are also found to be light-weight and low-cost,

The invention claimed is:

1. A substrate coated with a thermal management material for an electronic device, wherein the thermal management material comprises:
    a thermal conductive coat deposited on the substrate; and
    a heat insulation coat deposited on the thermal conductive coat,
wherein the heat insulation coat comprises a plant root powder and a resin.

2. The substrate according to claim 1, wherein the plant for the plant root powder is selected from *Paspalidium geminatum, Cyperus eragrostis, Rumex crispus, Plantago lanceolate*, lavancha, vetiver and combinations thereof.

3. The substrate according to claim 1, wherein the plant root powders have a particle size of from 1 μm to 50 μm.

4. The substrate according to claim 1, wherein the plant root powder is present in the heat insulation coat in an amount of 6.25 wt. % to 55 wt. %, based on the total weight of the heat insulation coat.

5. The substrate according to claim 1, wherein the resin is selected from polyurethane, polyacrylic, polyester, ethylene-vinyl acetate (EVA), polyamide, polyester-polyether copolymer, polyamide-polyether copolymer and combinations thereof.

6. The substrate according to claim 1, wherein the thermal conductive coat comprises a resin and a thermal conductive material, wherein the thermal conductive material is selected from copper, aluminium, silver, graphite, graphene, aluminium nitride, boron nitride, silicon carbide and combinations thereof.

7. The substrate according to claim 6, wherein the thermal conductive material is present in the thermal conductive coat in an amount of 0.74 wt. % to 25 wt. %, based on the tote weight of the thermal conductive coat.

8. The substrate according to claim 6, wherein the thermal conductive coat has an average thickness of 5 μm to 100 μm.

9. The substrate according to claim 1, wherein substrate comprises a metal alloy selected from an aluminium alloy, a magnesium alloy, a lithium alloy, a titanium alloy and stain steel, a plastic selected from polybutylene terephthalate, polyphenylene sulfide, polyamide, polyphthalamide, acrylonitrile butadiene styrene, polyetheretherketone, polyester, polyurethane, polycarbonate and acrylonitrile butadiene styrene with polycarbonate, a carbon fibre or combinations thereof.

10. The substrate according to claim 1, wherein the electronic device is selected from a computer, a laptop, a tablet, a cell phone, a portable networking device, a portable gaming device and a portable GPS.

11. A process for coating a substrate with a thermal management material for an electronic device comprising:
    applying a thermal conductive coating solution to the substrate;
    heating the substrate to form a thermal conductive coat deposited the substrate;
    applying a heat insulation coating solution to the thermal conductive coat, wherein the heat insulation coating solution comprises a plant root powder and a resin; and
    heating the substrate to form a heat insulation coat deposited on the thermal conductive coat.

12. The process of claim 11, wherein the thermal conductive coating solution is applied to the substrate by screen printing, slot die, spray coating, inkjet printing or 3D printing.

13. The process of claim 11, wherein the heat insulation coating solution is applied to the thermal conductive coat by screen printing, slot die, spray coating, inkjet printing or 3D printing.

14. An electronic device having a housing, wherein the housing comprises:
    a substrate;
    a thermal conductive coat deposited on the substrate; and
    a heat insulation coat deposited on the thermal conductive coat, wherein the heat insulation coat comprises a plant root powder and a resin.

15. The electronic device according to claim 14, wherein a heat generating component is aligned with the heat insulation coat.

* * * * *